US007308768B2

(12) United States Patent
Rice et al.

(10) Patent No.: US 7,308,768 B2
(45) Date of Patent: Dec. 18, 2007

(54) LENTICULAR SIGN

(75) Inventors: Mike L. Rice, Minneapolis, MN (US); April E. Jackson, Golden Valley, MN (US); James J. Marson, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 323 days.

(21) Appl. No.: 11/052,009

(22) Filed: Feb. 4, 2005

(65) Prior Publication Data

US 2006/0174524 A1 Aug. 10, 2006

(51) Int. Cl.
*G03B 23/02* (2006.01)

(52) U.S. Cl. ............................ 40/454; 40/431; 40/433; 40/442; 40/454; 411/80.1; 362/293

(58) Field of Classification Search ................ 362/363, 362/367, 453, 329, 332, 806, 809; 40/454, 40/584, 429, 606.01; 359/619, 620, 628, 359/621

See application file for complete search history.

(56) References Cited

U.S. PATENT DOCUMENTS 2,280,684 A 4/1942 Bronner, Sr.
2,608,779 A * 9/1952 Joy ............................. 40/431
2,798,939 A 7/1957 White
3,178,843 A 4/1965 Hammer
3,241,428 A 3/1966 Rice et al.
3,538,323 A 11/1970 Ziegler
3,587,185 A * 6/1971 Deal ........................... 40/564
3,683,526 A 8/1972 Horvath
3,807,072 A 4/1974 Luxon, Jr.
3,868,501 A 2/1975 Barbour
4,203,241 A 5/1980 Wallace
4,825,234 A 4/1989 Cai
4,870,768 A * 10/1989 Watt et al. ..................... 40/430
D330,223 S 10/1992 Crum
5,450,094 A 9/1995 Li et al.
6,286,873 B1 9/2001 Seder
6,331,151 B2 12/2001 Calandro
6,553,699 B2 * 4/2003 Edmunds et al. ............. 40/624
2003/0095079 A1 * 5/2003 Ishikawa et al. ............... 345/6

* cited by examiner

*Primary Examiner*—Lesley D. Morris
*Assistant Examiner*—Shin Kim
(74) *Attorney, Agent, or Firm*—Faegre & Benson LLP

(57) ABSTRACT

An exhibit including a non-planar outer piece formed from a plurality of substantially flat lenticular panels. The outer piece defines an interior and is configured to display an external view of the interior through the plurality of substantially flat lenticular panels.

27 Claims, 9 Drawing Sheets

LENTICULAR SIGN

BACKGROUND OF THE INVENTION

Signs have long been used to display information to customers or other observers. Eye-catching, fun, interesting, or otherwise unique signs or exhibits help grab an observer's attention, make a viewing experience more enjoyable, or otherwise increase communicative impact on the observer. Lenticular images have been used as one way of catching a viewer's attention. A "lenticular surface," or a surface including lenses, is often associated with a piece of ribbed plastic aligned with a series of segmented images. In such applications, elongate and transparent ribs act as lenticules, or lenses. Often, the lenticules run vertically, such that a viewer turning the surface, or passing by the lenticular surface, views an incrementally changing image. The use of segmented lenticular images can facilitate visual effects such as: flips, where two or more images change between one another; three-dimensional effects; animations, with three or more images used to create the illusion of motion; and other variations or combinations of such effects.

SUMMARY OF THE INVENTION

One aspect of the invention relates to an exhibit comprising a non-planar outer piece formed from a plurality of substantially flat lenticular panels, the outer piece defining an interior. The outer piece is configured to display an external view of the interior through the plurality of substantially flat lenticular panels. According to one embodiment, the exhibit can further comprises a base defining a first surface and a second surface, wherein the outer piece defines a first portion and a second portion, the first portion of the outer piece distinctly formed from the second portion of the outer piece, and the inner piece defines a first portion and a second portion, the first portion of the inner piece distinctly formed from the second portion of the inner piece. According to one related embodiment, the base is configured to secure the first portion of the outer piece relative to the second portion of the outer piece and to secure the first portion of the inner piece relative to the second portion of the inner piece.

Another aspect of the invention relates to a method of displaying comprising introducing a display to an observer, the display comprising a cover including a plurality of lenses and defining an inner space. The method also includes presenting a diffuse optical representation of the inner space of the display to the observer through the cover.

Yet another aspect of the invention relates to a sign comprising means for disposing a plurality of lenses about an object. The sign also comprises means for presenting an out-of-focus image of the object through the plurality of lenses, wherein the object is offset from the plurality of lenses.

BRIEF DESCRIPTION OF THE DRAWINGS

Embodiments of the invention will be described with respect to the figures, in which like reference numerals denote like elements, and in which.

DETAILED DESCRIPTION

Figure 1:
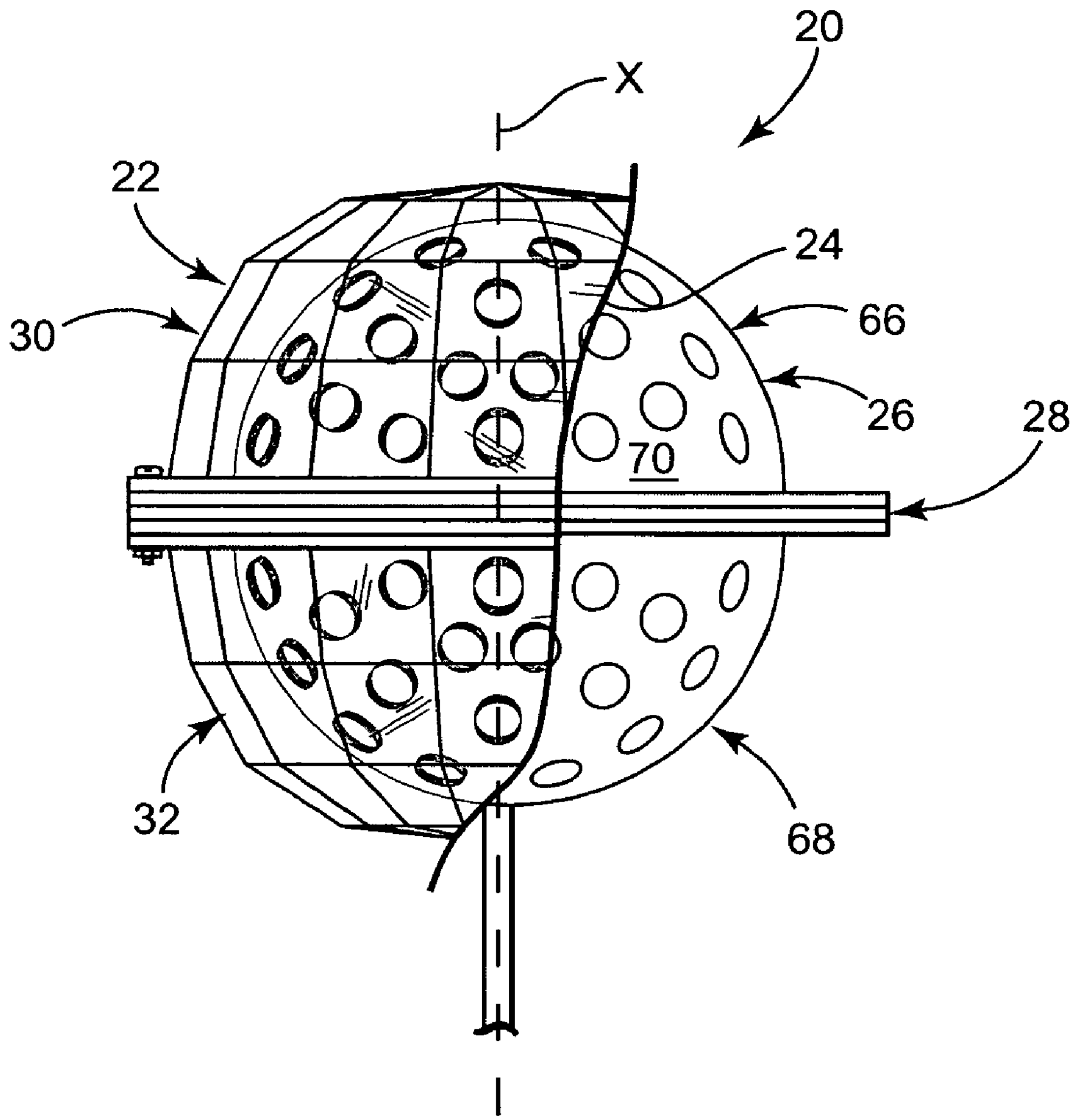
FIG. 1 is a front view of a sign according to an embodiment of the present invention shown with a portion of an outer piece of the sign cut away.
Figure 2:
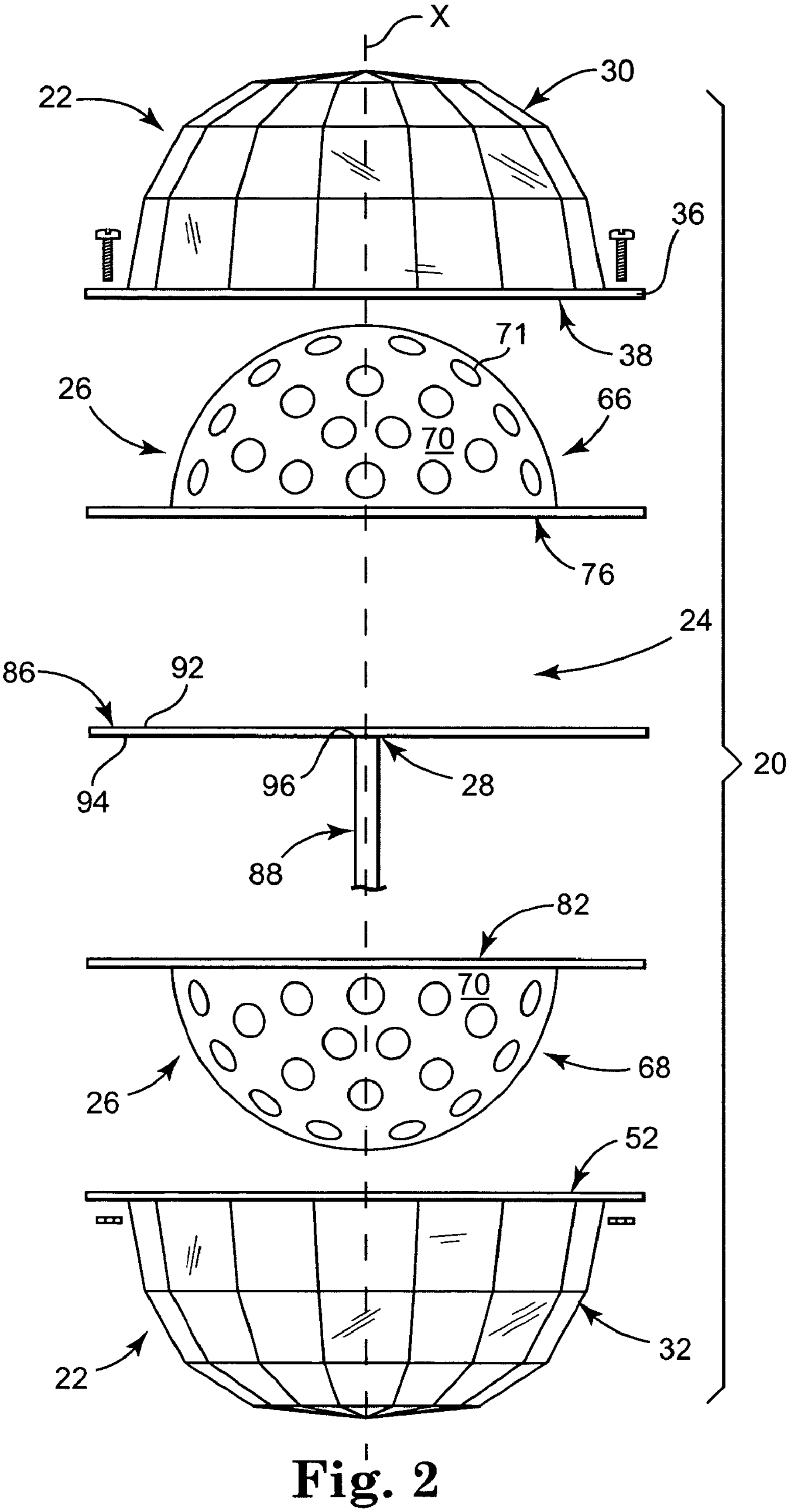
FIG. 2 is a front, exploded view of the sign of FIG. 1, according to an embodiment of the present invention.

FIGS. 1 and 2 show a sign 20 for exhibiting or displaying information. Generally speaking, the sign 20, or exhibit, defines a central longitudinal axis X, and comprises an outer piece 22 defining a sign interior 24, an inner piece 26, or inner object, residing within the interior 24, and a base 28 for securing the inner piece 26 relative to the outer piece 22.

Figure 3A:
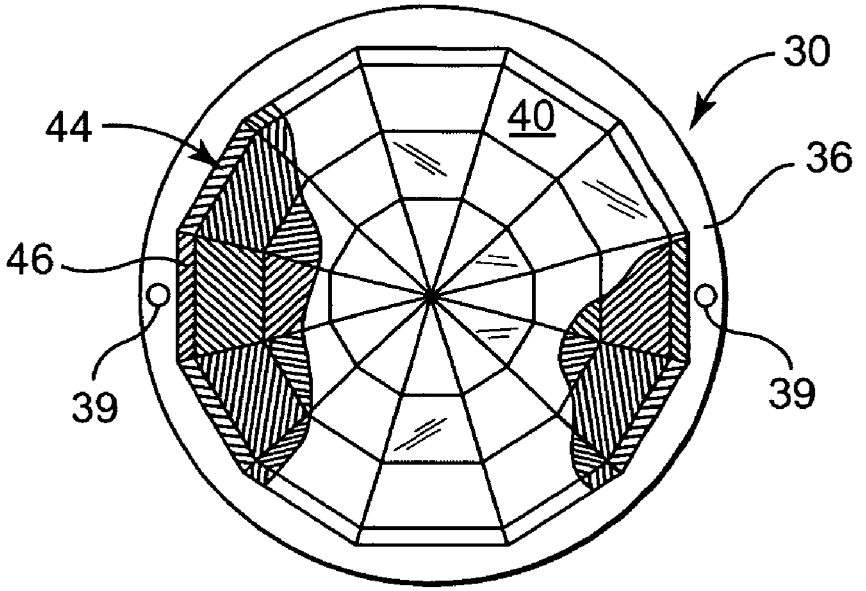
FIG. 3A is a top view of the outer piece of the sign of FIG. 1, according to an embodiment of the present invention.
Figure 6A:
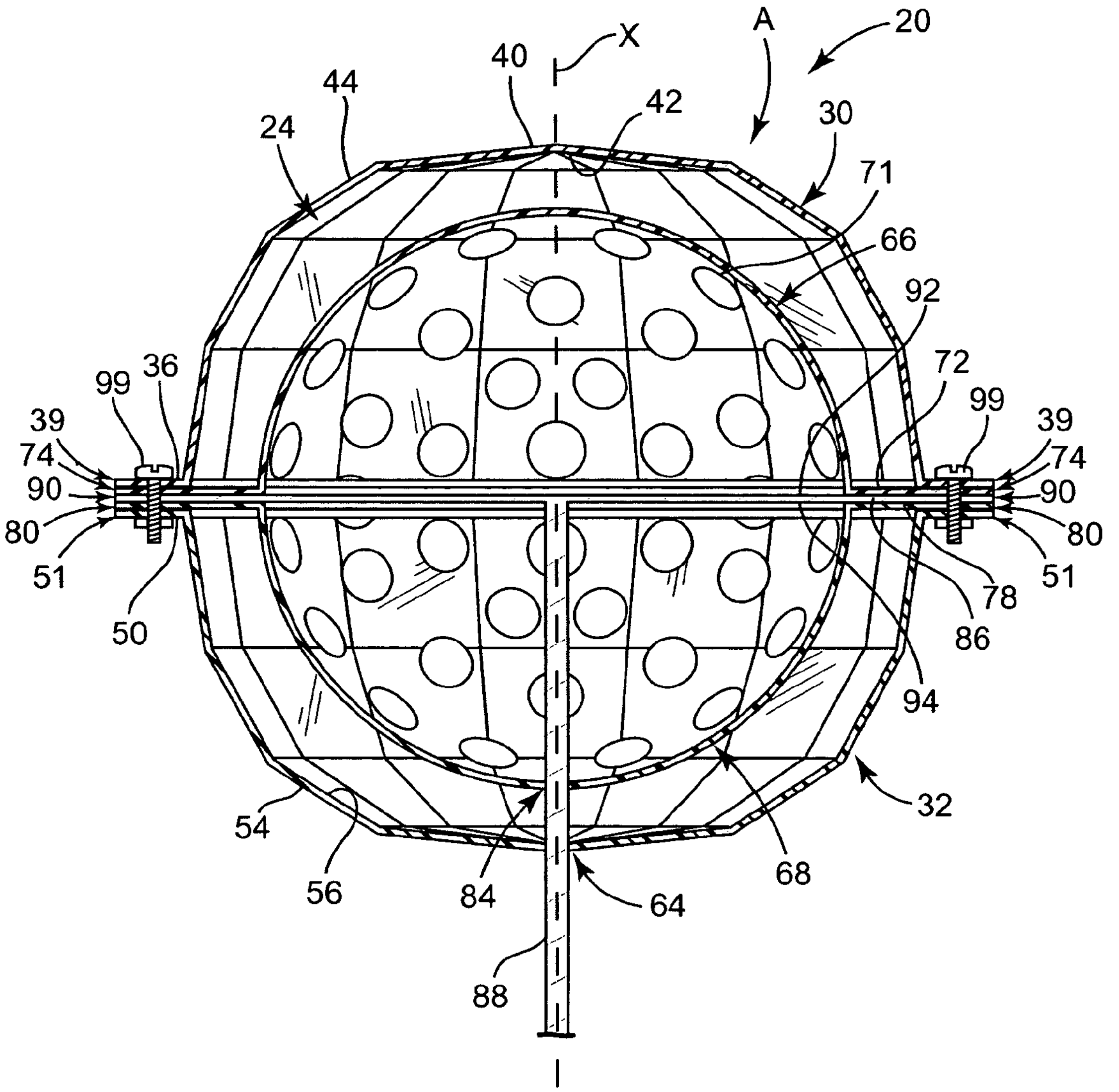
FIG. 6A is a front, cross-sectional view along a central longitudinal axis of the sign of FIG. 1, according to an embodiment of the present invention.

The outer piece 22 is hollow and formed from a first portion 30 and a second portion 32, the two portions 30, 32 combining to act as a cover and to define the sign interior 24 as indicated. With reference to FIG. 3A, the first portion 30 defines a flange 36 circumscribing an open end 38 (FIG. 2) of the first portion 30. The first portion 30 also includes an outer surface 40 and an inner surface 42 (FIG. 6A), the inner surface 42 being proximate the sign interior 24 (FIG. 6A). The first portion 30 is formed by a plurality of transparent, or semi-transparent lenticular panels 44.

The flange 36 has an average inner diameter of about 20 inches and an outer diameter of about 21.3 inches, according to one embodiment, although other dimensions are contemplated. The flange 36 includes holes 39 that, as will be described in further detail below, facilitate assembly of the sign 20. As shown in the figures, the flange 36 is continuously formed with the first portion 30 of a transparent or semi-transparent plastic material. In other embodiments, the flange 36 is distinctly formed from the first portion 30, and is affixable thereto in any of a variety of ways, including adhesively.

Each of the plurality of lenticular panels 44 is formed from plastic, glass, or other appropriate materials. The first portion 30, including the plurality of lenticular panels 44, is manufactured utilizing injection molding or vacuum forming in some embodiments of the present invention. Each of the plurality of lenticular panels 44 is substantially flat, or planar, and includes a plurality of lenticules, or lenses 46. Each of the plurality of lenses 46 defines a focal length and forms a raised, elongate, and hemispherical in cross-section projection, having a length running continuously across a corresponding one of the plurality of lenticular panels 44, i.e., "hemi-cylindrical." For example, in one embodiment, each of the plurality of lenses is formed of 21.5 mil, 60 lines per inch Amorphous Polyethylene Terephthalate (APET) material. In other embodiments, each one of the plurality of lenses 46 is formed as an indented, elongate, and hemispherical (in cross-section) depression, having a length running continuously across a corresponding one of the plurality of lenticular panels 44.

For clarification, it should be understood that the plurality of lenticular panels 44 shown in FIG. 3A each includes a corresponding plurality of lenses 46. However, for illustration purposes, only some of the plurality of lenticular panels 44 are actually shown with lens representations, in order to allow a clearer visual depiction of the structure and parts of the first portion 30. In one embodiment, the plurality of lenticular panels 44 are vacuum formed from a single sheet of lenticular material. Furthermore, while the plurality of lenses 46 are shown parallel to one another, in other embodiments, the plurality or lenses 46 are non-parallel and/or situated in different configurations and/or at different angles on each corresponding one of the plurality of lenticular surfaces 44. As shown more clearly in FIG. 6B, each of the plurality of lenses 46 is disposed on a corresponding one of the plurality of lenticular panels 44, such that the plurality of lenses 46 is formed on the outer surface 40. However, in other embodiments, the plurality of lenses 46 is disposed on the plurality of lenticular panels 44 such that each of the plurality of lenses 46 is formed on the inner surface 42.

With additional reference to FIG. 3A, the first portion 30 is partially formed by an arrangement of the plurality of substantially flat lenticular panels 44 in a "gem-like" configuration. As shown, each of the plurality of lenticular panels 44 is generally trapezoidal in shape up until the top "row" of panels, where thereafter each of the plurality of lenticular panels 44 takes a generally triangular shape. However, in one embodiment the top row of the plurality of lenticular panels 44 is replaced by a single, substantially flat panel serving as a top of the first portion 30. In another embodiment, the top rows of the plurality lenticular panels 44 is replaced by a substantially conical panel serving as the top of the first portion 30.

In one embodiment, each of the plurality of lenticular panels 44 defines a planar surface area ranging between about 12.7 square inches and about 3.4 inches, although other dimensions are contemplated. What is meant by "planar surface area" is the virtual surface area of each of the plurality of lenticular panels 44 without taking into account the curvature of the plurality of lenses 46. In effect, this is a measure of surface area normal to a plane of each of the lenticular panels 44. It should also be understood that in some embodiments, the plurality of lenticular panels 44 have a substantially equal planar surface area. In the embodiments shown in the figures, the plurality of lenticular panels 44 decrease in planar surface area in a direction moving away from the open end 38 (FIGS. 2 and 3A) of the first portion 30 toward the top of the first portion 30. In still other embodiments, the plurality of lenticular panels 44 take other shapes, such as octagons, pentagons, and/or circles for example.

As shown in the figures, the plurality of lenticular panels 44 form the first portion 30, and the first portion 30 is non-planar in shape. In particular, the first portion 30 is substantially hemispherical in shape, defining a generally curved profile on a "macroscopic" level; however, on a panel-by-panel basis, or on a "microscopic level," each of the plurality of lenticular panels 44 is substantially planar. As shown in FIG. 6A, the inner surface 42 generally tracks the outer surface 40 in shape, defining a thickness between the inner surface 42 and outer surface 40 of about 0.02 inches, although other dimensions are contemplated. In other embodiments, the inner surface 42 defines a smooth hemispherical shape while the outer surface is jagged or gem-like, as defined by the arrangement of the plurality of substantially flat lenticular panels 44. In one embodiment, the outer surface 40 defines an average, or "macroscopic," radius of about 10 inches, although other dimensions are contemplated.

Figure 3B:
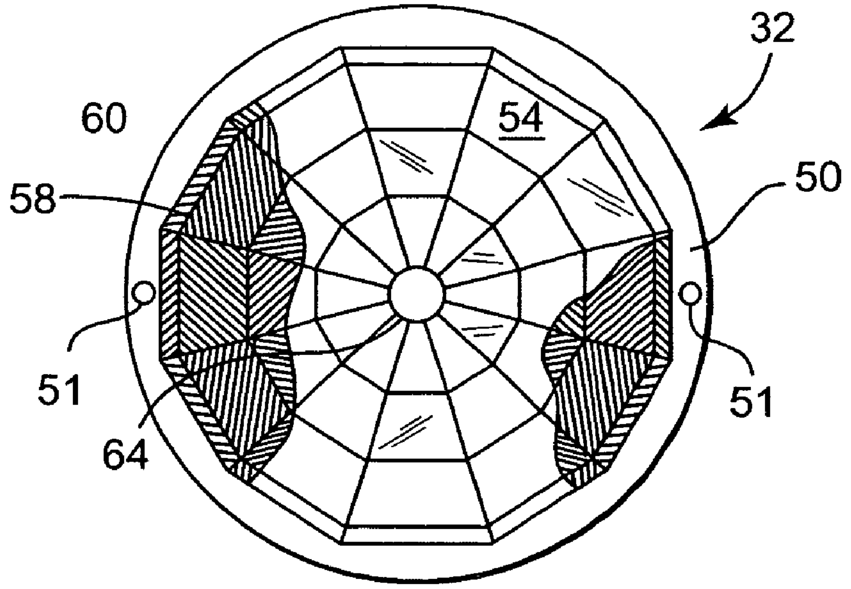
FIG. 3B is a bottom view of the outer piece of the sign of FIG. 1, according to an embodiment of the present invention.

As shown in FIG. 3B, the second portion 32 of the outer piece 22 is largely a "mirror-image" of the first portion 30 and is formed similarly thereto. However, it should also be noted that other embodiments include the second portion 32 being substantially unlike the first portion 30, including the second portion 32 being formed of different materials or in different shapes than the first portion 30. With that in mind, the second portion 32 comprises a flange 50 having holes 51, the flange 50 circumscribing an open end 52 (FIG. 2) of the second portion 32. The second portion 32 also includes an outer surface 54 and an inner surface 56 (FIG. 6A), the inner surface 54 being proximate the sign interior 24 (FIG. 6A). The second portion 32 is also partially defined by an arrangement of a plurality of transparent, or semi-transparent lenticular panels 58, each of the plurality of lenticular panels 58 including plurality of lenses 60, each lens defining a focal length. With reference also to FIG. 6A, the second portion 32 includes a hole 64 running from the outer surface 54 to the inner surface 56 and located on the central longitudinal axis X of the sign. Subsequent parts of this detailed description will illustrate that the hole 64 facilitates assembly of the sign 20. In one embodiment, the hole has a diameter of about 0.75 inches, although other dimensions are contemplated.

As will be described in greater detail, the inner piece 26 acts as a visual element or inner object to be viewed through the outer piece 22, or cover, of the sign 20. In more specific terms, and with reference to FIGS. 1 and 2, the inner piece 26 comprises an inner piece first portion 66 and an inner piece second portion 68, the two portions 66, 68 combining to define the inner piece 26. In one embodiment, at least one of the first portion 66 and the second portion 68 defines an outer surface 70 of the inner piece 26. Additionally, each of the portions 66, 68 includes printed graphics or other indicia 71, such that the inner piece includes indicia 71 printed on an outer surface 70 of the inner piece 26. As shown, both of the first portion 66 and second portion 68 include printed "polka dot" graphics in one embodiment.

Figure 4A:
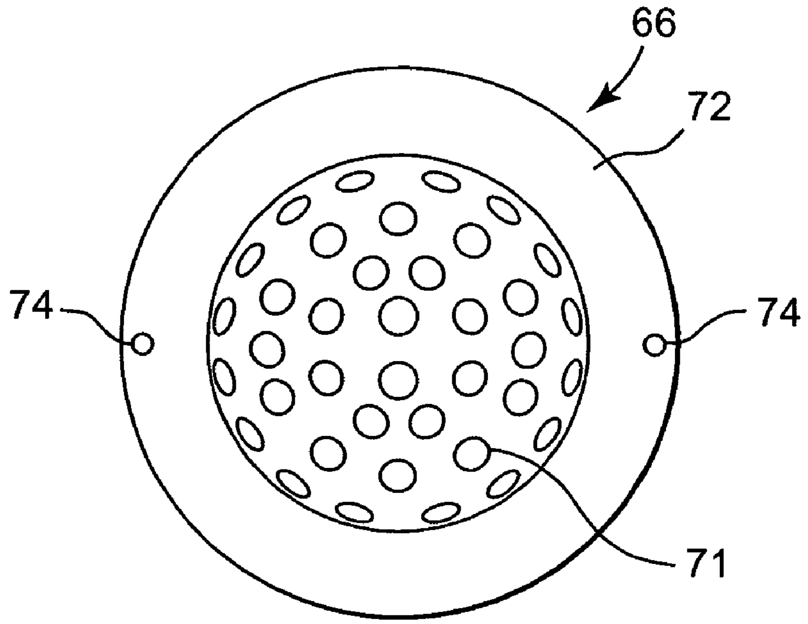
FIG. 4A is a top view of an inner piece of the sign of FIG. 1, according to an embodiment of the present invention.

With reference to FIG. 4A, the inner piece first portion 66 also includes a flange 72 including holes 74 generally corresponding in their size, and their location relative to the central longitudinal axis X, to the holes 39 and the holes 51 of the outer piece 22. The flange 72 is annular in shape defining an inner diameter of about 16.3 inches and an outer diameter of about 21.3 inches in one embodiment, although other dimensions are contemplated. As shown in FIG. 6A, the inner piece first portion 66 is substantially hollow and hemispherical in shape, defining an open end 76 (FIG. 2). In one embodiment, the hemispherical shape of the inner piece first portion 66 defines an outer radius of about 8.15 inches and a thickness of about 0.02 inches, although other dimensions are contemplated. The inner piece first portion 66 is formed of transparent or semi-transparent plastic, including the flange 72. In other embodiments, the inner piece first portion 66 is formed of other materials, such as glass or non-transparent plastic, for example.

Figure 4B:
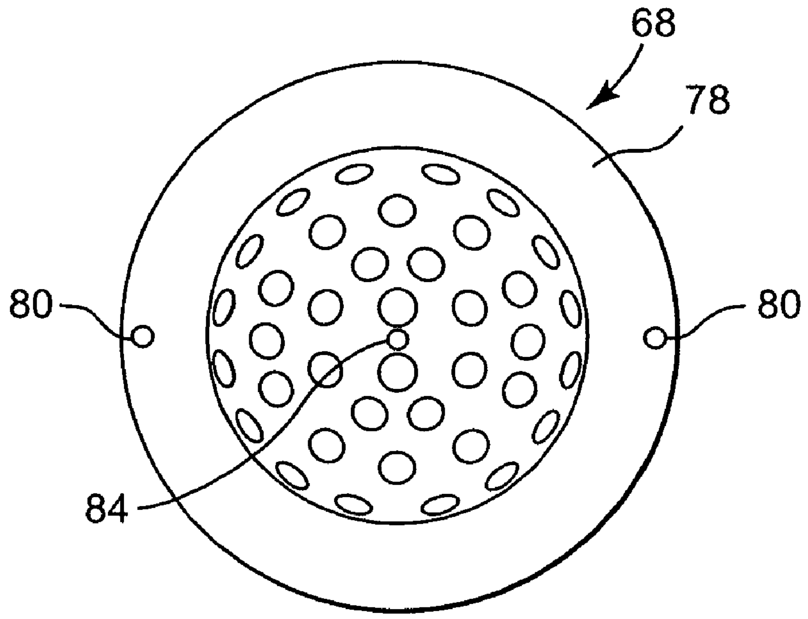
FIG. 4B is a bottom view of the inner piece of the sign of FIG. 1, according to an embodiment of the present invention.

With reference to FIG. 4B, the inner piece second portion 68 is similar to the first portion 66, in one embodiment. The second portion 68 includes a flange 78 including holes 80 generally corresponding in size and location relative to the central longitudinal axis X to the holes 39, the holes 51, and the holes 74. The flange 78 is annular in shape defining an inner diameter of about 16.3 inches and an outer diameter of about 21.3 inches in one embodiment, although other dimensions are contemplated. As shown in FIG. 6A, the inner piece second portion 68 is substantially hollow and hemispherical in shape, defining an open end 82 (FIG. 2). In one embodiment, the hemispherical shape of the second portion 68 defines an outer radius of about 8.15 inches and a thickness of about 0.02 inches, although other dimensions are contemplated. The inner piece second portion 68 also has a hole 84 running along the central longitudinal axis X through the thickness of the second portion 68. In one embodiment, the hole 84 defines a diameter of about 0.75 inches, although other dimensions are contemplated. The inner piece second portion 68 is formed of transparent or semi-transparent plastic, including the flange 78. In other embodiments, the inner piece second portion 68 is formed of other materials, such as glass or non-transparent plastic, for example.

Figure 5:
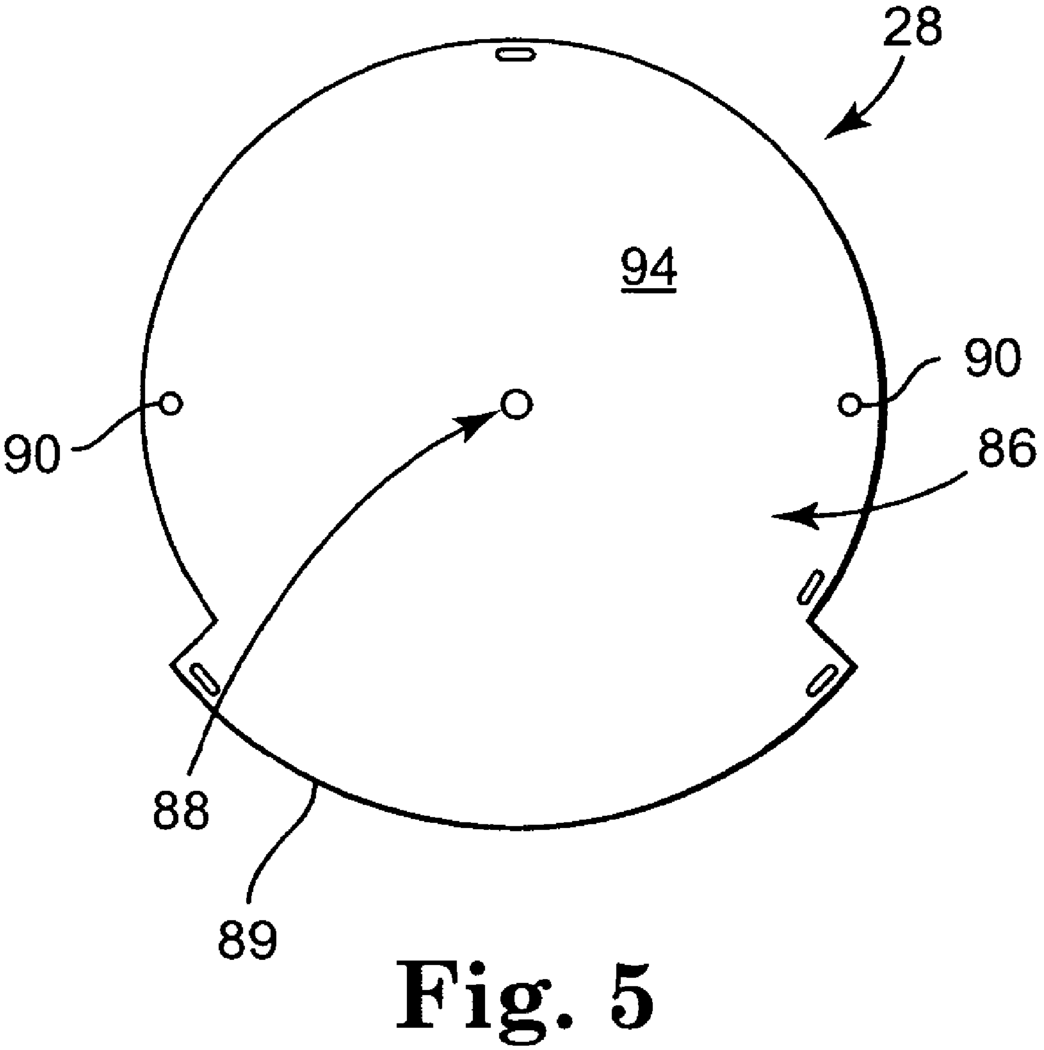
FIG. 5 is a bottom view of a base of the sign of FIG. 1, according to an embodiment of the present invention.

With reference to FIGS. 2 and 5, the base 28 comprises a mounting member 86 and a stem 88 in one embodiment. As shown, the mounting member 86 is substantially circular in profile, defining a diameter of about 21.3 inches and a thickness of about 0.05 inches in one embodiment, although other dimensions are contemplated. The mounting member 86 also defines a lip 89 extending from the circular profile. As will become apparent from the discussion below, the lip 89 is used to facilitate assembly of objects or indicia to the sign 20. In one embodiment, the mounting member 86 is formed of transparent, or semi-transparent plastic. In other embodiments, the mounting member 86 is formed of glass or metals, aluminum alloy for example. The mounting member 86 includes holes 90 generally corresponding in size and location relative to the central longitudinal axis X to the holes 39, 54, 71, 80. The mounting member 86 defines a first surface 92 and an opposite second surface 94. As shown in FIG. 2, each of the surfaces 92, 94 are substantially planar. In some embodiments, the mounting member 86 includes a central hole (not shown), coaxial with the central longitudinal axis X used to assemble the mounting member 86 to the stem 88.

With reference to FIG. 2, the stem 88 is a cylinder having a length of about 40 inches and a radius of about 0.75 inches, although other dimensions are contemplated. The stem 88 runs from a first end 96 to a second end (not shown). In one embodiment, the stem 88 and the mounting member 86 are continuously formed. In other embodiments, the stem 88 includes a threaded hole running along the central longitudinal axis X and located at the first end 94 of the stem 88. The threaded hole is used to bolt the mounting member 86 to the stem 88 in one embodiment. The stem 88 is formed of transparent, or semi-transparent plastic. In other embodiments, the stem 88 is formed of metal, such as aluminum alloy for example. The stem 88 and the mounting member 88 are assembled coaxially such that the stem 88 runs orthogonal to the first and the second surfaces 92, 94 of the mounting member 86.

With reference to FIG. 6A, one method of assembling the sign 20 is described as an example of how the outer piece 22 acts as a means for disposing the pluralities of lenses 46, 60 about a viewable object, the inner piece 26. The inner piece first portion 66 is disposed with the first portion open end 76 (FIG. 2) facing the mounting member first surface 92. The flange 72 of the inner piece first portion 66 is abutted against the mounting member first surface 92. Additionally, the mounting member holes 90 are aligned with the flange holes 74 of the inner piece first portion 66, such that the mounting member 86 and the inner piece first portion 66 are coaxial. The inner piece second portion 68 is disposed with the second portion open end 82 (FIG. 2) facing toward the mounting member second surface 94. The stem second end (not shown) is guided through the second portion longitudinal hole 84, such that the stem 88 extends away from the open end 82 and through the hole 84. The mounting member holes 90 are aligned with the flange holes 80 of the inner piece second portion 68, such that the mounting member 86 and the inner piece second portion 68 are coaxial.

The flange 36 of the outer piece first portion 30 is abutted against the flange 72 of the inner piece first portion 66 with the open end 38 over the inner piece first portion 30. The holes 39 of the flange 36 are aligned with the holes 74 of the flange 72 such that the outer piece first portion 30 and the inner piece first portion 66 are coaxial. In this manner, the outer piece first portion 30 covers the inner piece first portion 66. The stem second end (not shown) is guided through the longitudinal hole 64 of the outer piece second portion 32. The flange 50 of the outer piece second portion 32 is abutted against the flange 78 of the inner piece second portion 68 with the open end 52 (FIG. 2) over the inner piece second portion 32. The holes 51 of the flange 50 are aligned with the holes 80 of the flange 78 such that the outer piece second portion 32 and the inner piece second portion 68 are coaxial, and the outer piece second portion 32 covers the inner piece second portion 68.

Bolts 99, which are also formed of transparent or semi-transparent material in one embodiment, are then threaded through the holes 39, 74, 90, 80, 51 to secure the outer piece first portion 30, the outer piece second portion 32, the inner piece first portion 66, and the inner piece second portion 68 relative to the base mounting member 86, and relative to one another. As assembled, the inner piece 26 is disposed within the outer piece 22 such that the inner piece 26 and outer piece 22 are substantially concentric spheres. In other embodiments, clips, ties, glue or other fasteners are used to secure portions 30, 32, 66, 68 relative to the base mounting member 86, and one another.

With reference to FIG. 6A, it should be noted that by forming the flanges 36, 50, 72, 78 and the base mounting member 80 of transparent, or semi-transparent material, the inner piece 26 is more visible from various angles of observation. Additionally, the inner piece 26 and the outer piece 22 more greatly resemble single pieces, rather than distinct portions.

Figure 6B:
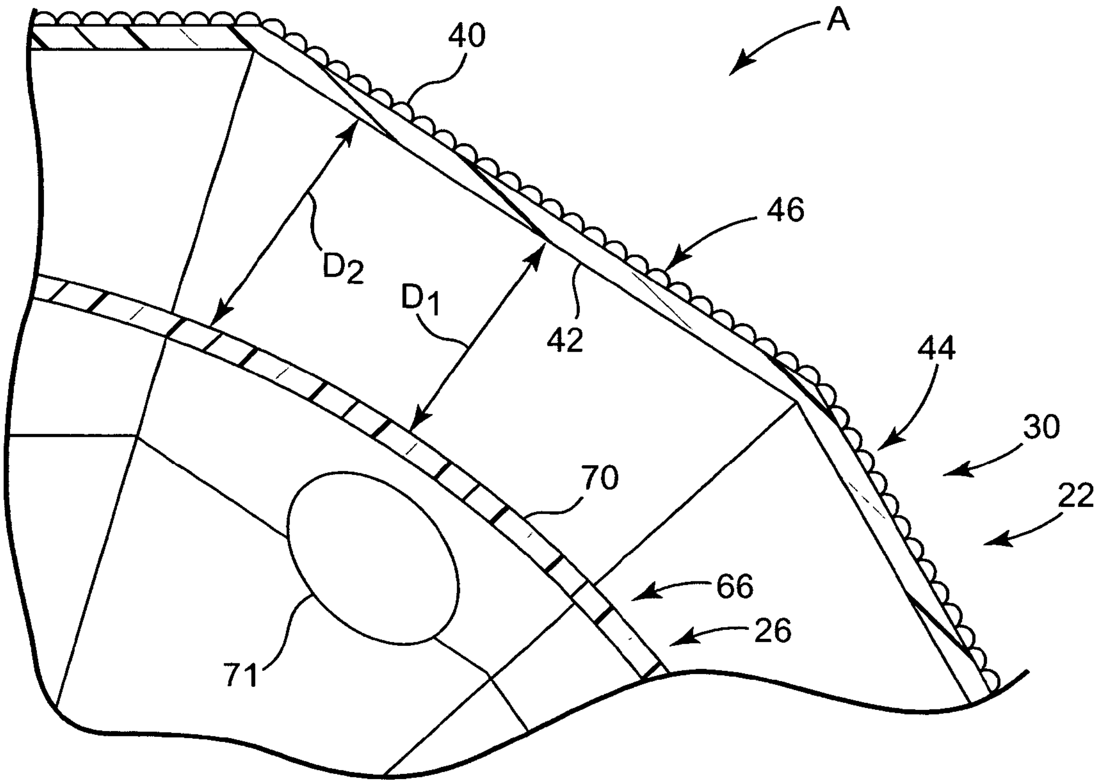
FIG. 6B is an enlarged view of FIG. 3A, according to an embodiment of the present invention.

With reference to FIG. 6B, operation of the sign 20, including an example of means for providing an out-of-focus image of the inner piece 26 through the pluralities of lenses 46, 60, is described with reference to a portion A of the sign 20 as shown. It should be noted that other portions of the sign 20 generally operate under similar principles. The plurality of lenses 46 display an external view of a display surface presented by the first portion 66 of the inner piece 26 that is diffuse, or otherwise distorted. This diffuse effect is used to present an interesting exterior view of at least the first portion 66 of the inner piece 26 or indicia 71 printed thereon. As shown, the indicia 71 printed on the first portion 66 of the inner piece 26 and the first portion 66 itself are continuous, and not segmented. In other words, rather than having segmented images, each aligned to the plurality of lenses 46, the first portion 66 includes a single continuous image of the outer surface 70 including printed polka dots, which is then presented through the plurality of lenses 46. As a result, an observer is not presented with the “flip” or other effects associated with lenticular surfaces presenting segmented images.

Furthermore, the outer surface 70 and indicia 71 of the inner piece 26 is at an offset, such as offsets $D_1$, $D_2$, from the inner surface 42 of the first portion 30 of the outer piece 22 as illustrated in FIG. 6B. In part, the diffuse effect is accomplished as the focal lengths of each of the plurality of lenses 46 are less than the offset. In one embodiment, the "image" presented by the inner piece 26 is offset relative to the focal lengths such that the image, e.g., polka dots, or other indicia 71, appears "out-of-focus" or diffuse. As can be seen in the view of portion A of the sign 20, the offset changes from $D_1$ to $D_2$ as one moves about the outer surface 70. Thus, in one embodiment, the offset can be described as a minimum $D_1$, for example, a minimum of about 1.5 inches, although other dimensions are contemplated. The offset, in combination with the spherical, or curved shape of the outer surface 70 of the inner piece 26, acts to vary a magnification and/or focus of each of the views presented to the observer through each of the plurality of lenses 46, 60. In effect, the plurality of lenses 46, 60 are purposefully misaligned with the inner piece 26, i.e., the object or image viewed such as indicia 71. The variation in magnification and/or focus results in an eye-catching diffuse or fuzzy, distorted image that optionally changes and morphs according to a viewer's vantage point.

It should be noted that in other embodiments, the inner piece 26 is configured to include a plurality of segmented images corresponding to the plurality of lenses 46, 60, such that when the observer views the plurality of lenses 46, 60 from one angle, the observer is presented with selective views of the plurality of segmented images. In yet other embodiments, the inner piece 26 is configured to include a plurality of continuous images, with each one of the images corresponding to a single one of the plurality of lenses 46, 60, such that a viewer is presented a substantially in-focus and three-dimensional view of a two-dimensional image. While the views presented to the observer in these other "segmented image" embodiments can be mildly blurred, such views are not necessarily diffuse as understood in association with the embodiments of the present invention.

Figure 7:
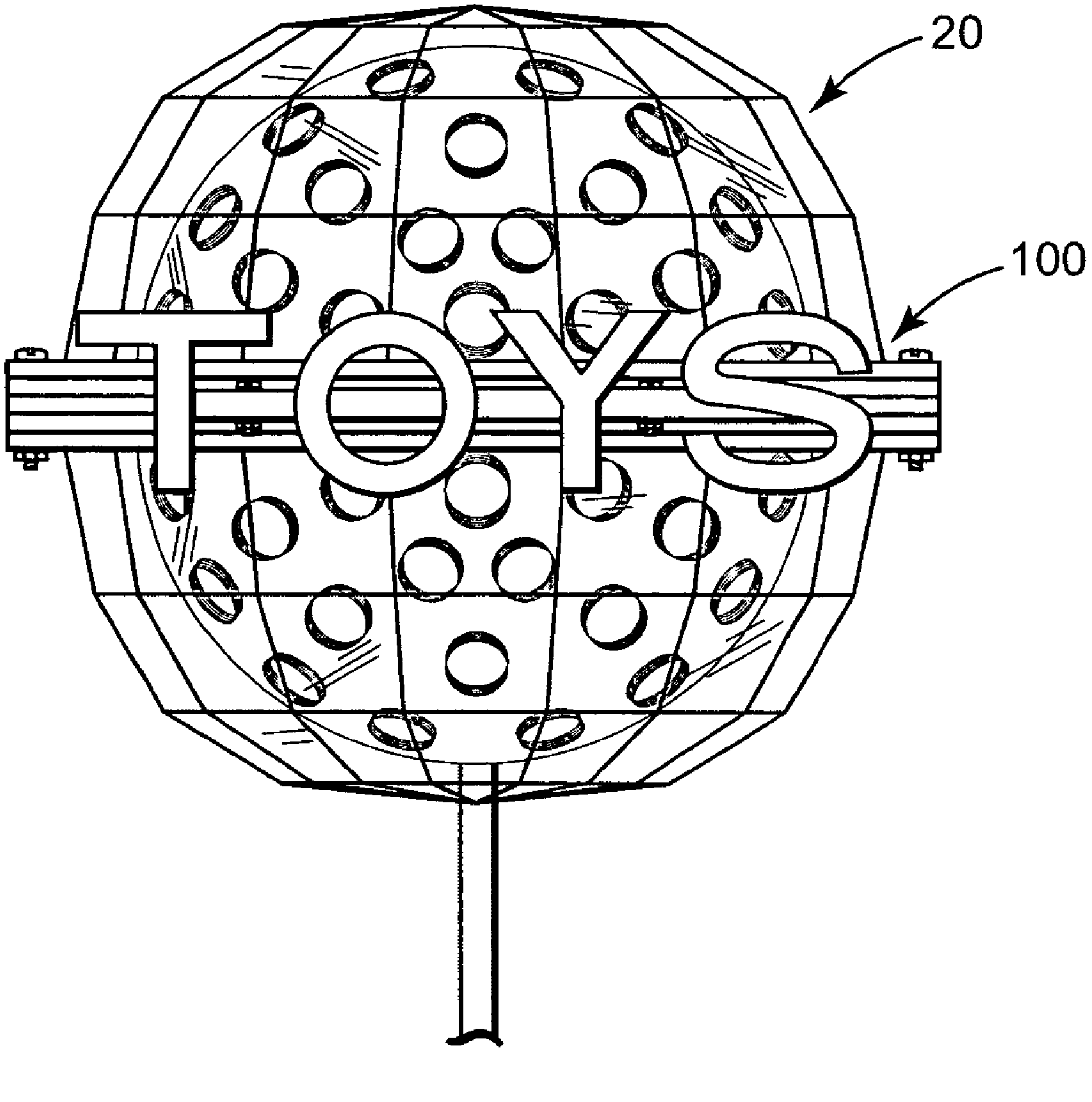
FIG. 7 is a front view of a sign according to an embodiment of the present invention.

In other embodiments of the sign 20, other viewable features are incorporated with the sign 20 to further augment an effect of the display on the observer. As shown in FIG. 7, the sign 20 carries three-dimensional indicia 100. In one embodiment, the three-dimensional indicia 100 include a transparent band tying together block lettering formed of paper and/or foam material. The indicia 100 are affixed to sign 20 using bolts, adhesives, clips, or other attachment devices. In one embodiment, the three-dimensional indicia 100 are secured to the sign 20 by bolting the three-dimensional indicia to the lip 89 of mounting member 86 (FIG. 5).

Figure 8:
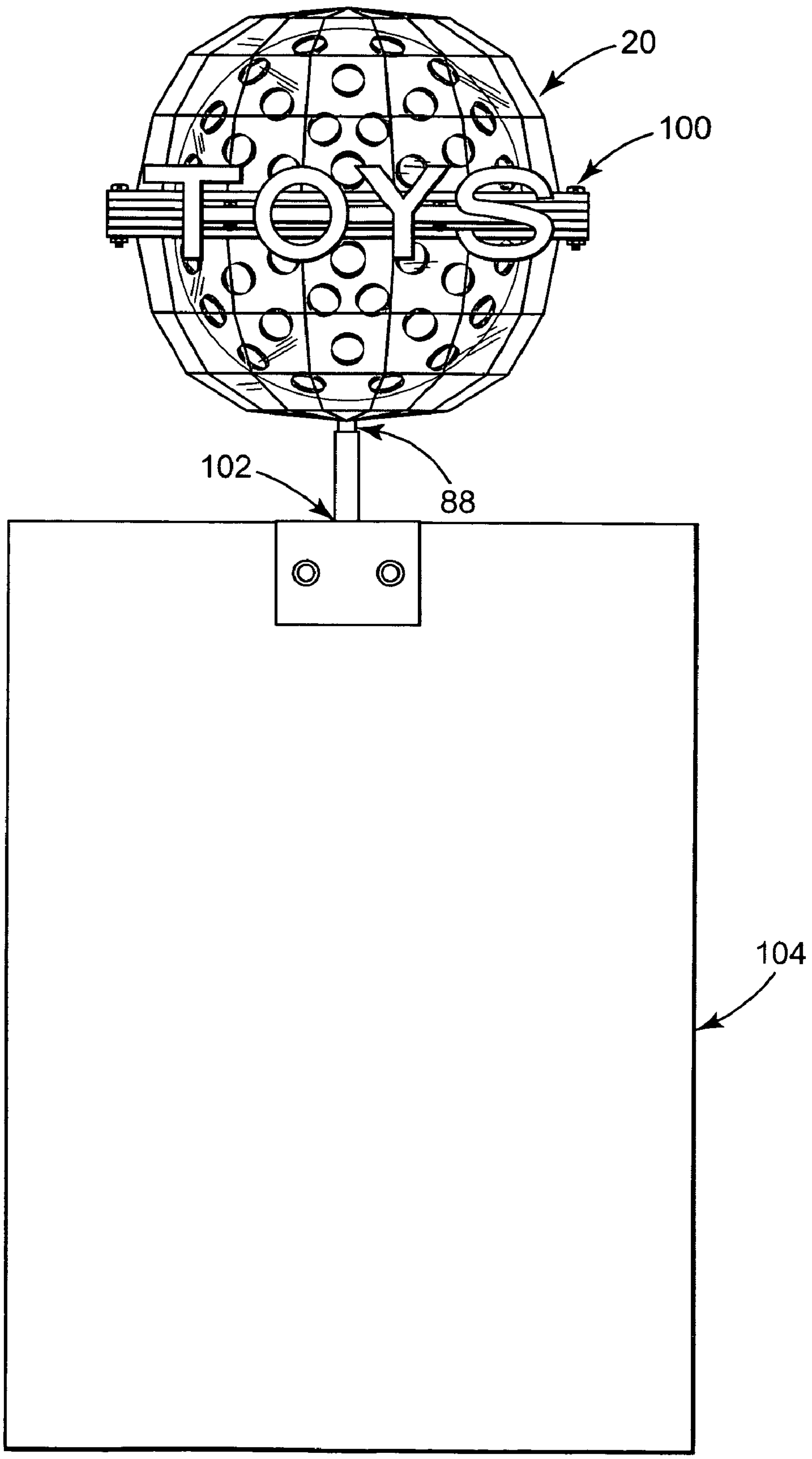
FIG. 8 is a front view of a sign according to an embodiment of the present invention.

With reference to FIG. 8, a method of displaying is described. The sign 20 is configured to present a diffuse optical representation of the interior 26 of the sign to an observer. In some embodiments, the sign 20 is introduced to the observer in a retail environment, such as a store. As shown in FIG. 8, the method includes utilizing means for affixing the three-dimensional indicia 100 to an exterior of the sign 20, such that the sign 20 supports the three-dimensional indicia 100. The method also includes utilizing means for securing the sign 20 to a structure 104. For example, in one embodiment a fixture 102 is used to secure the sign 20 to a structure 104. As shown in FIG. 8, the stem 88 of the sign 20 is inserted into the fixture 102, which, in turn, is secured to the structure 104. In one embodiment, the structure 104 is a display shelf. In a related embodiment, the structure 104 is an endcap of a display shelf.

In the foregoing detailed description, reference is made to the accompanying figures, which form a part hereof, and in which is shown by way of illustration specific embodiments in which the invention may be practiced. In this regard, directional terminology, such as "top," "bottom," "front," "back," "left," "right," etc., is used with reference to the orientation of the Figure(s) being described. Because components of the embodiments of the present invention can be positioned in a number of different orientations, the directional terminology is used for purposes of illustration and is in no way limiting. It is to be understood that other embodiments may be utilized and structural or logical changes may be made without departing form the scope of the present invention. The foregoing detailed description, therefore, is not to be taken in a limiting sense, and the scope of the present invention is defined by the appended claims.

Although specific embodiments have been illustrated and described herein, it will be appreciated by those of ordinary skill in the art that a variety of alternate and/or equivalent implementations may be substituted for the specific embodiments shown and described without departing from the scope of the present invention. With that in mind, this application is intended to cover any adaptations or variations of the specific embodiments discussed herein. For example, although described above as being formed in a particular shape or of a particular size, other suitable sizes and shapes of signs are also contemplated. Other modifications within the scope of the invention and its various embodiments will be apparent to those of ordinary skill in the art.

What is claimed is:

1. An exhibit comprising:

a non-planar outer piece defining an interior and being formed from a plurality of substantially flat lenticular panels, each of the substantially flat lenticular panels including a plurality of lenticules;

wherein the outer piece is configured to display an external view of the interior through the plurality of substantially flat lenticular panels.

2. The exhibit of claim 1, wherein the substantially flat lenticular panels are substantially trapezoidal in shape.

3. The exhibit of claim 1, wherein the outer piece is substantially spherical.

4. The exhibit of claim 1, wherein the outer piece is hollow.

5. The exhibit of claim 1, further comprising:

an inner piece disposed within the outer piece, the inner piece defining a display surface, wherein the outer piece is configured to display an external view of the display surface through the plurality of lenticular panels.

6. The exhibit of claim 5, wherein the inner piece is substantially spherical.

7. The exhibit of claim 5, wherein the inner piece and the outer piece are each substantially spherical in shape and substantially concentric relative to each other.

8. The exhibit of claim 5, wherein the display surface includes graphics.

9. The exhibit of claim 5, wherein the outer piece defines an outer surface and an inner surface, and the display surface is offset from the outer piece inner surface and includes a non-segmented image, such that plurality of substantially flat lenticular panels displays a diffuse external view of the display surface.

10. The exhibit of claim 5, further comprising:

a base defining a first surface and a second surface;

wherein the outer piece defines a first portion and a second portion, the first portion of the outer piece distinctly formed from the second portion of the outer piece, and the inner piece defines a first portion and a second portion, the first portion of the inner piece distinctly formed from the second portion of the inner piece; and further wherein the base is configured to secure the first portion of the outer piece relative to the second portion of the outer piece and to secure the first portion of the inner piece relative to the second portion of the inner piece.

11. A method of displaying comprising:

introducing a display to an observer, the display comprising a cover including a plurality of lenses and defining an inner space, the display further comprising a visual element positioned within the inner space the visual element having an outer surface; and presenting a diffuse optical representation of a single image of the outer surface of the visual element to the observer through the plurality of lenses of the cover.

12. The method of claim 11, further comprising displaying the outer surface of the visual element through a plurality of substantially flat surfaces that each include a plurality of lenses.

13. The method of claim 12, further comprising displaying the outer surface of the visual element through a plurality of partially cylindrical lenses.

14. The method of claim 11, further comprising displaying a substantially curved profile of the visual element through the plurality of lenses.

15. The method of claim 11, further comprising displaying printed indicia on the visual element to the observer.

16. The method of claim 11, further comprising:

assembling a first section of the cover and a second section of the cover to a base; and assembling a first section of the visual element and a second section of the visual element to the base such that the cover is secured about the visual element.

17. The method of claim 11, further comprising displaying the visual element through a substantially curved profile of the cover.

18. The method of claim 11, wherein introducing the display to an observer includes introducing the display to an observer in a retail environment.

19. The method of claim 11, further comprising utilizing the display to support a three-dimensional object defining indicia.

20. The method of claim 11, further comprising securing the display to a structure.

21. The method of claim 11, further comprising securing the display to an endcap of a shelf.

22. A sign comprising:

means for disposing a plurality of substantially planar lenticular surface about an object, each of the substantially planar lenticular surfaces including a plurality of lenses; and means for presenting an out-of-focus image of the object through the plurality of lenses, wherein the object is offset from the plurality of lenses.

23. The sign of claim 22, wherein the object includes indicia.

24. The sign of claim 22, further comprising means for assembling the sign to a shelf.

25. The sign of claim 22, farther comprising means for assembling three-dimensional indicia to an exterior of the sign.

26. An exhibit comprising:

a non-planar outer piece formed from a plurality of substantially flat lenticular panels, the outer piece defining an interior, wherein the outer piece is configured to display an external view of the interior through the plurality of substantially fiat lenticular panels, and wherein the outer piece defines a first portion and a second portion, the first portion of the outer piece distinctly formed from the second portion of the outer piece;

an inner piece disposed within the outer piece, the inner piece defining a display surface, wherein the outer piece is configured to display an external view of the display surface through the plurality of lenticular panels, wherein the inner piece defines a first portion and a second portion, the first portion of the inner piece distinctly formed from the second portion of the inner piece; and a base defining a first surface and a second surface, wherein the base is configured to secure the first portion of the outer piece relative to the second portion of the outer piece and to secure the first portion of the inner piece relative to the second portion of the inner piece.

27. A method of displaying comprising:

introducing a display to an observer, the display comprising a cover including a plurality of lenses and defining an inner space;

positioning a visual element within the inner space of the cover by assembling a first section of the cover and a second section of the cover to a base and assembling a first section of the visual element and a second section of the visual element to the base such that the cover is secured about the visual element; and presenting a diffuse optical representation of the inner space of the display to the observer through the cover, including presenting an optical representation of the visual element.

* * * * *